US012769146B2

(12) United States Patent
Gamlin

(10) Patent No.: US 12,769,146 B2
(45) Date of Patent: Oct. 20, 2026

(54) SPECTACLES SUPPORTING HEADBAND

(71) Applicant: Herbert Gamlin, Tiverton (GB)

(72) Inventor: Herbert Gamlin, Tiverton (GB)

(*) Notice: Subject to any disclaimer, the term of this patent is extended or adjusted under 35 U.S.C. 154(b) by 254 days.

(21) Appl. No.: 18/636,485

(22) Filed: Apr. 16, 2024

(65) Prior Publication Data

US 2024/0302674 A1 Sep. 12, 2024

Related U.S. Application Data

(63) Continuation of application No. PCT/GB2022/052549, filed on Oct. 7, 2022.

(30) Foreign Application Priority Data

Oct. 20, 2021 (GB) ...................................... 2114993

(51) Int. Cl.
*G02C 3/00* (2006.01)

(52) U.S. Cl.
CPC .................................... *G02C 3/003* (2013.01)

(58) Field of Classification Search
CPC ........... G02C 3/003; G02C 3/02; G02C 11/00
USPC ........................................... 351/41, 155, 156
See application file for complete search history.

(56) References Cited

U.S. PATENT DOCUMENTS

| | | | |
|---|---|---|---|
| 5,355,185 | A | 10/1994 | Lee |
| 6,142,623 | A | 11/2000 | Jones |
| 7,011,406 | B1 | 3/2006 | Kim |
| 11,079,609 | B1 | 8/2021 | Martin |
| 2020/0166774 | A1 | 5/2020 | Lee |
| 2021/0191147 | A1 | 6/2021 | Thiruppathi |
| 2021/0191150 | A1 | 6/2021 | Tsuchiya |

FOREIGN PATENT DOCUMENTS

| | | |
|---|---|---|
| KR | 2020-0043149 | 4/2020 |
| WO | 2016/093500 | 6/2016 |

OTHER PUBLICATIONS

UKIPO, Search Report in corresponding UK application GB2114993.5, Apr. 19, 2022.
UKIPO, Examination Report in corresponding UK application GB2114993.5, Dec. 19, 2023.
UKIPO, Examination Report in corresponding UK application GB2114993.5, Feb. 22, 2024.
WIPO, International Search Report and Written Opinion in corresponding PCT Application PCT/GB2022/052549, Jan. 2, 2023.

*Primary Examiner* — Tuyen Tra
(74) *Attorney, Agent, or Firm* — Alley IP

(57) ABSTRACT

To reduce pressure of wearing spectacles on a wearer's ears and nose, a spectacles supporting headband (10) is provided, for use with spectacles having lenses, a bridge, and two arms (70) positionable over a wearer's ears (75). The spectacles supporting headband comprises a head-gripping member (20) and two brackets (30), each bracket comprising a first projection (40), the spectacles supporting headband configured to move between an inactive and active position, relative to a user's head, wherein, in the active position, each first projection is configured to support a respective arm (70) of the spectacles, such that the spectacles are lifted, and held, off the ears (75), and wherein each bracket also comprises a second projection (50) to grip the respective spectacles arm between it and the first projection, the projections being in fixed locations relative to the headband, to prevent the respective arm (70) tilting relative to the head-gripping member.

11 Claims, 7 Drawing Sheets

SPECTACLES SUPPORTING HEADBAND

RELATED APPLICATIONS

This application claims the benefit under 35 U.S.C. § 120, and is a continuation, of co-pending International Application PCT/GB2022/052549, filed Oct. 7, 2022 and designating the US, which claims priority to GB Application 2114993.5, filed Oct. 20, 2021, such GB Applications also being claimed priority to under 35 U.S.C. § 119. These GB and International applications are incorporated by reference herein in their entireties.

FIELD

The present invention relates generally to a spectacles supporting headband and a method of adjusting the position of a pair of spectacles on the head of a user and finds particular, although not exclusive, utility in improving the comfort of wearing spectacles.

BACKGROUND

When spectacles are worn the weight is borne by the top of the wearer's ears and the nose. It can be uncomfortable to wear spectacles for long durations due to this weight. Also, spectacles can slip forward, relative to the user's head during movement and especially if the user is sweating. Accordingly, it is desirable to provide a device which alleviates the weight of the spectacles from the user's ears and/or nose, and also maintains them in position relative to the user's head.

SUMMARY

In a first aspect, the present invention provides a spectacles supporting headband, for use with spectacles of the type which comprises lenses, a bridge, and two arms positionable over a wearer's ears in use, the spectacles supporting headband comprising a head-gripping member and two brackets, each bracket comprising a first projection, the spectacles supporting headband configured to move between an inactive position, and an active position, relative to a user's head, wherein, in the active position, each first projection is configured to support a respective arm of the spectacles, such that the spectacles are lifted, and held, off the ears of a user, and wherein each bracket also comprises a second projection configured to grip the respective spectacles arm between it and the first projection, the projections being in fixed locations relative to the headband, to thereby prevent the respective arm of the spectacles tilting relative to the head-gripping member.

The term "spectacles" is taken to mean "pair of spectacles" or "glasses."

In this regard, the spectacles may be lifted off the ears but remain resting on the user's nose. Alternatively, each first projection may be configured to support a respective arm of the spectacles in use, such that the spectacles are lifted, and held, off the nose. In such circumstances, spectacles may be lifted off, and held above, both the ears and the nose of the wearer.

The first and second projections may extend outwardly from the user's head, in use. Alternatively, they may project inwardly towards the user's head.

The spectacles supporting headband may be configured such that in use each first projection extends underneath the respective spectacles arm, and each second projection extends above the respective spectacles arm.

The head-gripping member may comprise an open loop of resilient material configured to fit snugly around a user's head in use. The resilient material may comprise metal, such as stainless steel. The term "resilient" may mean that the loop is expandable by the exertion of force on its ends, but that after removal of the force, the loop returns to its previous size and shape. In this way, the loop may grip the user's head, in use. The initial shape of the loop may be adjusted by gentle bending by hand.

The spectacles supporting headband may be configured such that, in use, the first projections are located between the user's ears and their face.

The spectacles may be configured such that, in use, the second projections are located behind the first projections. In this regard, the term "behind" may mean rearward of the user's face.

The spectacles may be configured to rotate, when moved in use, between the inactive and active positions, about a point located between the first and second projections, or about a point located on the head-gripping member equidistant between the two brackets. This rotation may enable the first projections to come into contact with the spectacle arms and thus raise them relative to the user's ears and/or nose.

Each first projection may comprise a rounded profile to aid its rotation relative to the respective arm of the spectacles, in use, as the spectacles supporting headband is moved between the inactive and active positions.

In a second aspect, the invention provides a method of adjusting the position of a pair of spectacles on the head of a user, the method comprising the steps of; providing a spectacles supporting headband according to the first aspect; placing the head-gripping member around the user's head such that the first projections are below the level of the top of the user's ear; placing a pair of spectacles on the user's head such that the lenses are in front of the user's eyes; rotating the spectacles supporting headband relative to the user's head such that the first projections contact the undersides of the arms and lift them away from the user's ears.

The method may comprise the step of further rotating the spectacles supporting headband relative to the user's head so that the second projections contact the upper sides of the arms, such that each arm is gripped between the first and second projections.

In a third aspect, the invention provides a method of adjusting the position of a pair of spectacles on the head of a user, the method comprising the steps of; providing a spectacles supporting headband according to the first aspect; placing the head-gripping member around the user's head such that the first projections are above the level of the top of the user's ear; placing a pair of spectacles on the user's head such that the first projections contact the undersides of the arms, and the second projections contact the upper sides of the arms; rotating the spectacles supporting headband relative to the user's head about the point located on the head-gripping member, such that the lenses are in front of the user's eyes, and the arms are held away from the user's ears.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
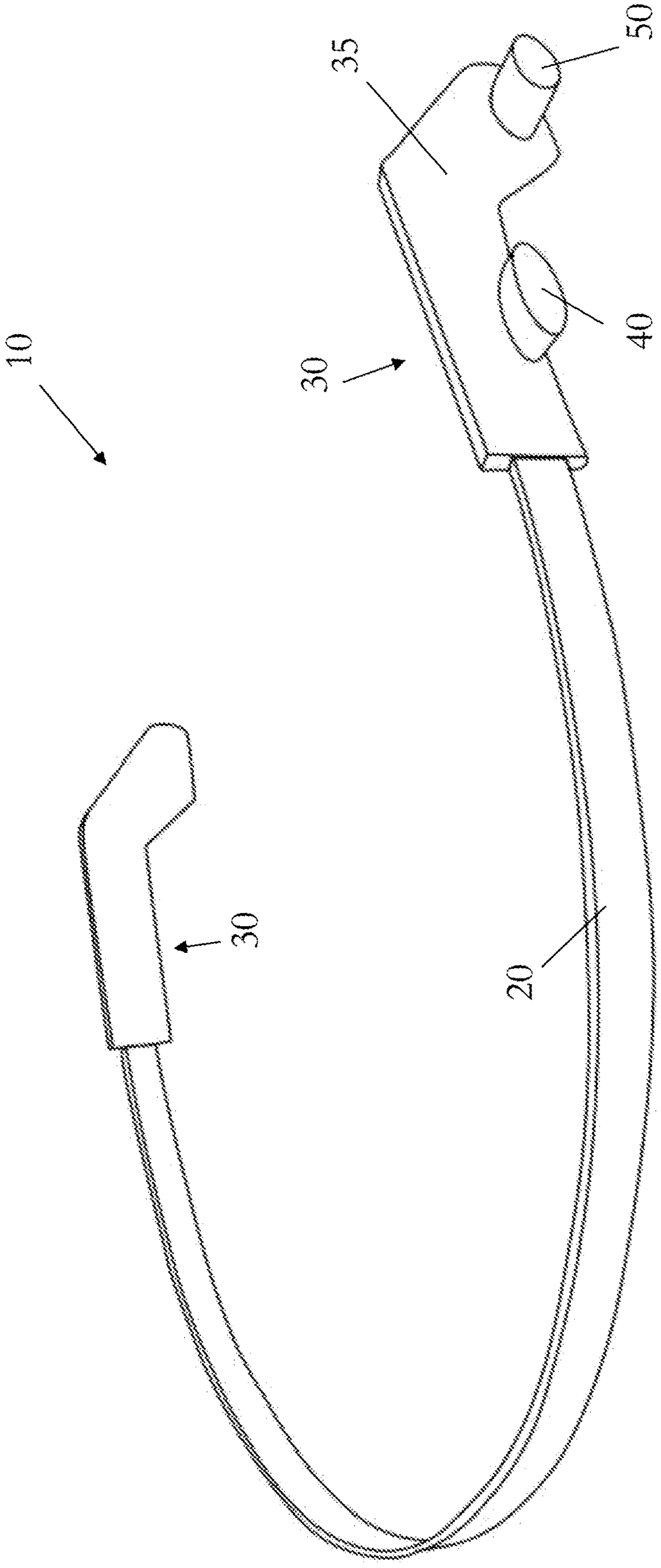
FIG. 1 is a perspective view of a spectacles supporting headband.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 shows a perspective view of a spectacles supporting headband 10 comprising an open loop, or head-gripping band, 20. At the end of each arm of the open loop, or head-gripping band 20, a bracket 30 is provided. Each bracket comprises an L shape member. A first arm of the L shape bracket 30 is attached to the end of the head-gripping band. This may be by insertion of the head-gripping band into a recess in the bracket, although means of connection are contemplated. The two components may be fixed together by gluing, welding or other known techniques. It is also contemplated that the head-gripping band and brackets may be integrally and unitarily formed.

The second arm 35 of each L shape bracket 30 depends downwardly from the bracket 30. The bracket 30 may be similar in shape to that of the part of a pair of spectacles known as the temples and temple tips. That is, the parts of a pair of spectacles which sit above and behind the ear of a user. The two arms may lie in the same plane, that plane, in use, being approximately parallel to the side of the user's head and the user's median plane.

Each bracket 30 also comprises two projections; a first projection 40, which projects radially outward from the head-gripping band, and which is located on the first arm of the L shape bracket 30; and a second projection 50, which projects radially outward from the head-gripping band 20, and which is located on the second arm 35 of the L shape bracket 30. Each projection extends in the range of 5 to 10 mm, although other dimensions are contemplated. The projections are located in fixed locations relative to the headband, in that their relative positions are immovable, in use.

Figure 2:
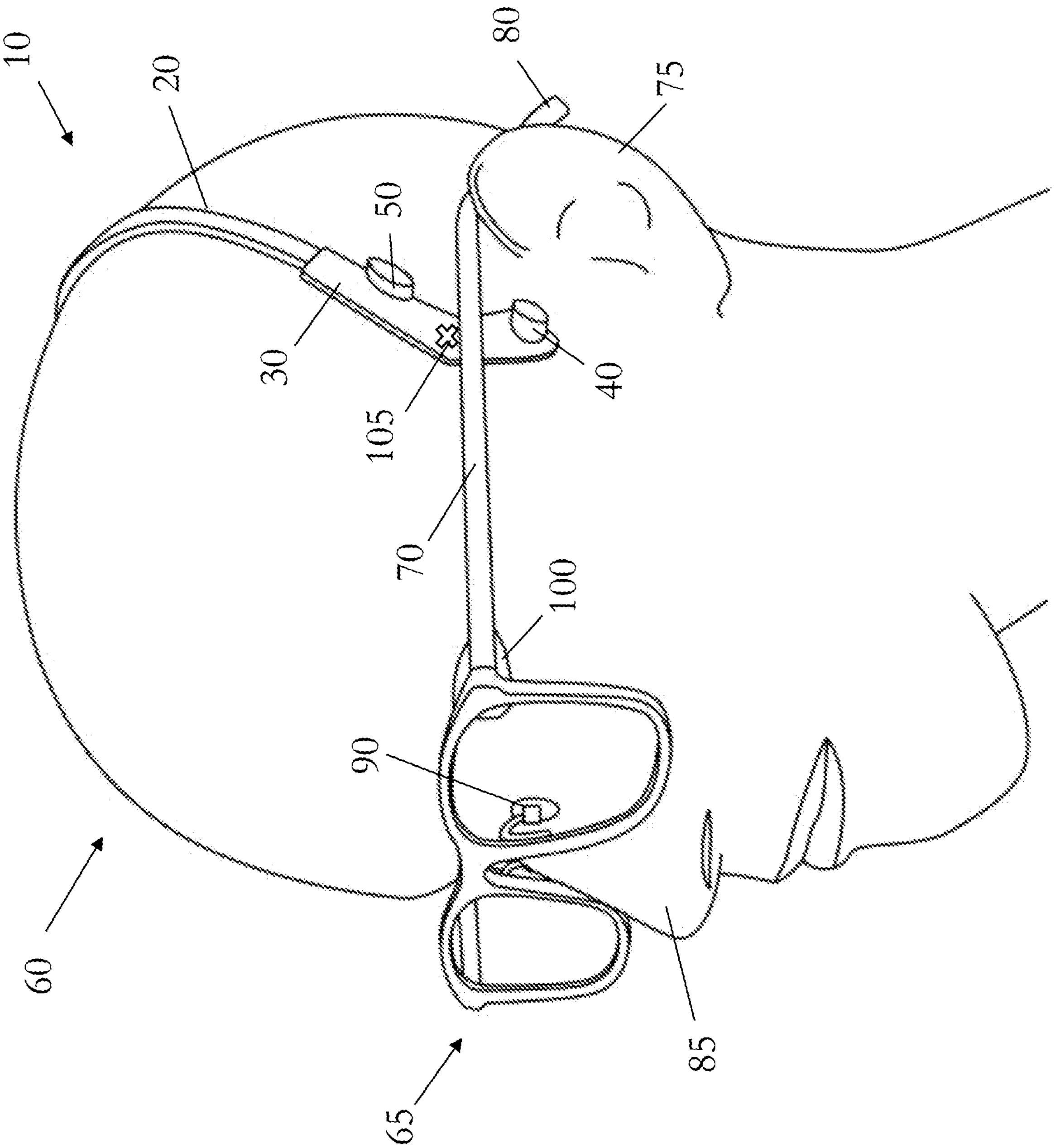
FIGS. 2 to 4 are perspective views of the headband of FIG. 1 in various positions on a user's head.

In FIG. 2, the head 60 of a user is depicted. The user is wearing a pair of spectacles 65 comprising the usual components of a frame holding a lens in front of each eye 100, nose pads 90 which support the frame on the user's nose 85, arms 70 which rest on the user's ears 75, and temple tips 80 which depend downwardly from the end of the arms 70 and tuck behind the user's ears 75.

A spectacles supporting headband 10 has been placed on the user's head 60 such that the plane in which the head-gripping band lies is inclined relative to, and above, the plane in which the arms 70 lie, by approximately 50 degrees. The bracket 30 is positioned adjacent and between the arms 70 and the user's head 60, and between the user's ears 75 and eyes 100. This position may be considered to be an inactive position.

The first projection 40 is arranged beneath the arms 70, while the second projection 50 is arranged above the arms 70, and above the first projections. To place the bracket 30 in this position may involve the user removing the spectacles 65 briefly, or at least pulling the arms 70 away from the head 60 while the first projections pass under the arms 70.

A notional pivot point, 105 is shown on the bracket 30 at the corner of the L shape and between the first and second arms of the bracket.

Figure 3:
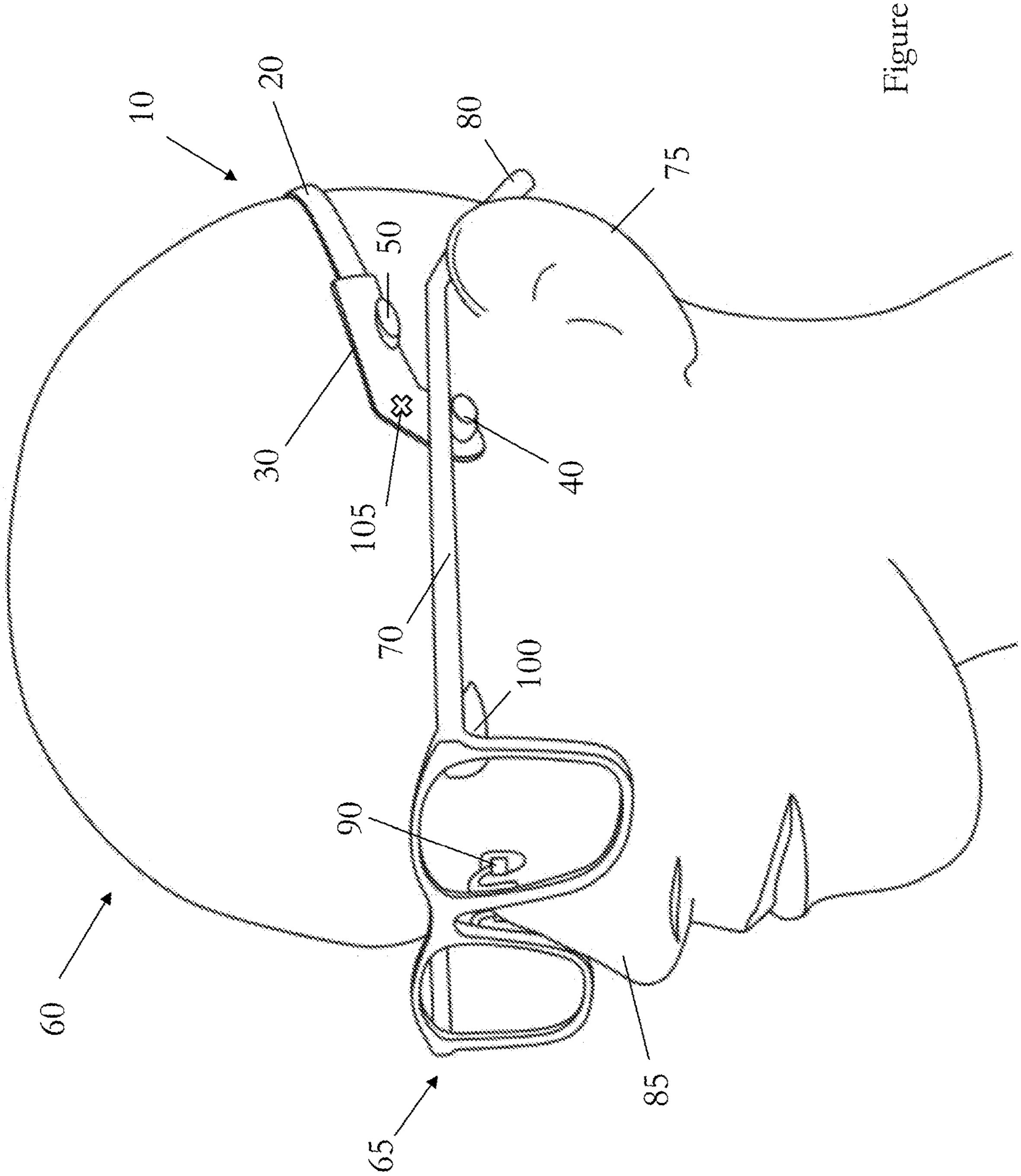

In use, the spectacles supporting headband 10 is then rotated about this approximate notional pivot point 105 downwardly (clockwise as shown in the Figures) such that the first projections 40 are moved upwardly and into contact with the underside of the arms 70. This movement lifts the arms 70 and the nose pads 90 upwardly away from the ears 75 and nose 85 respectively. This is shown in FIG. 3 where the angle of the plane in which the head-gripping band lies is now inclined relative to, and above, the plane in which the arms 70 lie, by approximately 30 degrees. This position may be considered to be an active position.

Figure 4:
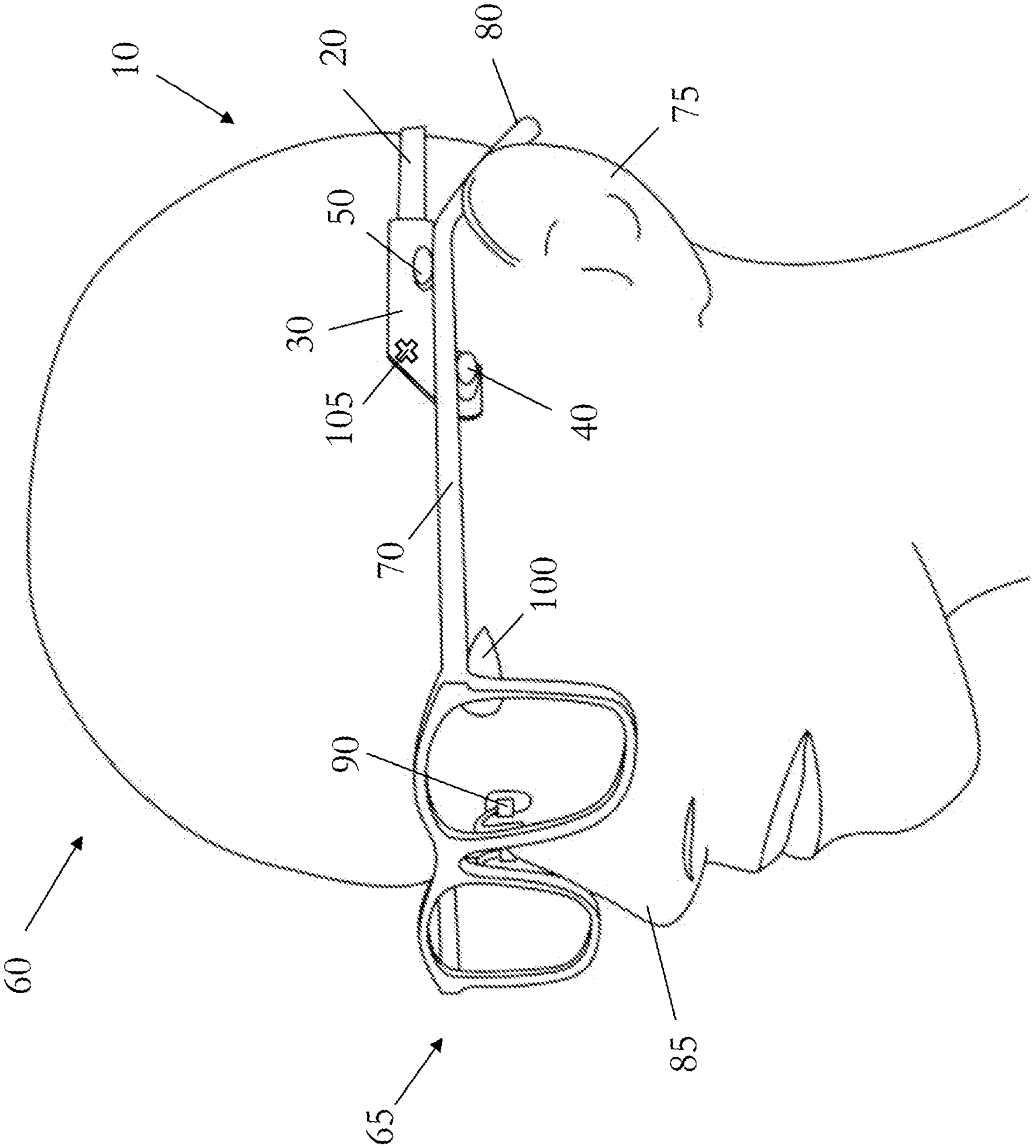

Further rotation of the spectacles supporting headband 10 is then effected about the notional pivot point 105 such that the first projection continues to lift the arms 70 and the nose pads 90 upwardly away from the ears 75 and nose 85 respectively. Also, the second projections 50 now move into contact with the upper side of the arms 70. This is shown in FIG. 4 where the angle of the plane in which the head-gripping band lies is now approximately parallel to the plane in which the arms 70 lie. This position may be considered to be an active position.

The positions of the first and second projections in this manner are such that the arms 70 are locked therebetween. This prevents the spectacles 65 from tilting downwardly at the front (where the lenses are located).

The head-gripping band 20 of the spectacles supporting headband 10 is able to grip the user's head 65 by virtue of it being resiliently biased to a shape smaller than the diameter of the head 65. Other means of allowing the head-gripping band 20 to grip the user's head 65 are contemplated, such as it including a comb for meshing with the user's hair, as often found in Alice bands.

The head-gripping band 20 may comprise a ribbon-like flat profile with dimensions in the ranges of 2 mm to 4 mm by 5 mm to 15 mm, although other profiles, shapes and sizes are contemplated.

The first projections are shown including a rounded profile to aid their rotation relative to the arms 70, in use, as the spectacles supporting headband is moved between the inactive and active positions.

Figure 5:
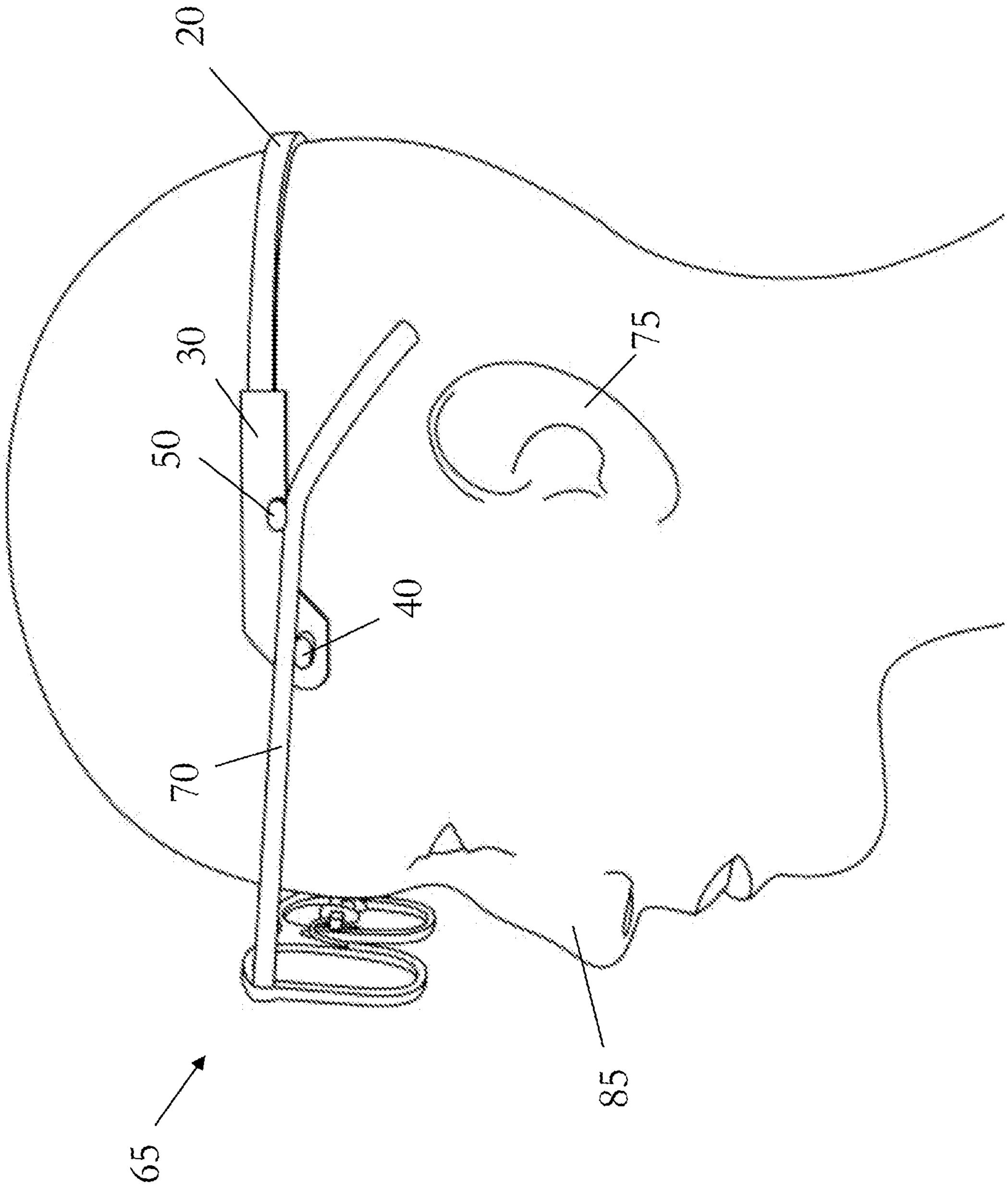
FIGS. 5 to 7 are perspective views of the headband of FIG. 1 in various alternative positions on a user's head.

An alternative method for using the spectacles supporting headband is described with reference to FIGS. 5 to 7. Initially, (see FIG. 5) the head-gripping band 20 of the spectacles supporting headband 10 is placed around a user's head such that the head-gripping band 20 is substantially parallel to the transverse plane of the user. The band is placed on the head above the ears 75. A pair of spectacles is then placed on the user's head such that the arms 70 are supported by the first 40 and second projections 50 on each bracket 30. As the band is arranged above the ears 75 it is likely that the lenses will not be in the correct place for vision with the nose pads 90 not resting on the nose 85.

The band 20 is then rotated about an alternative notional pivot point 106, located at the back of the user's head (at a mid-point of the band 20 between the two brackets 30). The rotation is such that the spectacles 65 move downwards with the alternative notional pivot point remaining substantially stationary relative to the user's head.

Figure 6:
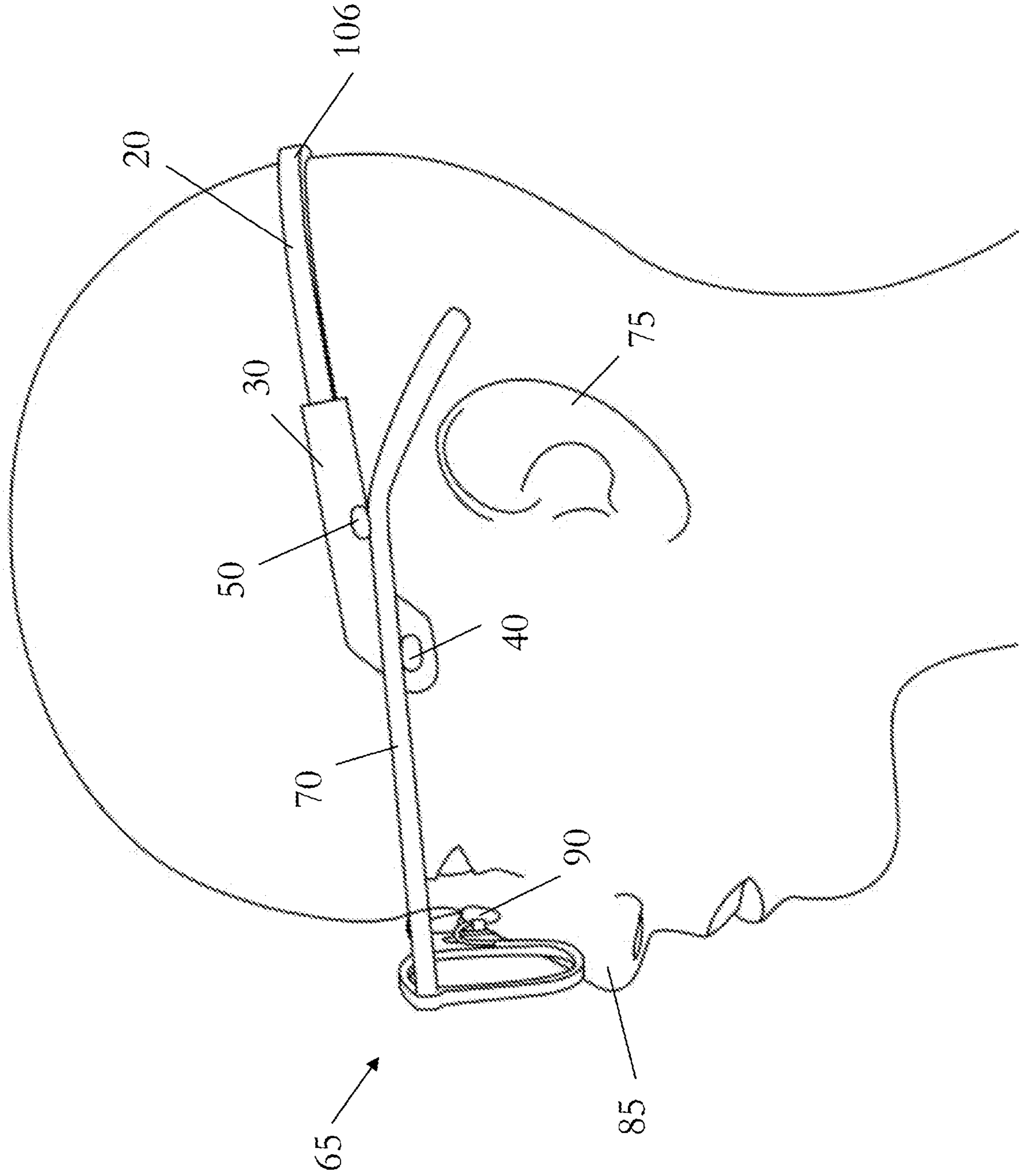

The spectacles 65 are now located such that the lenses are in front of the user's eyes 100 as shown in FIG. 6.

Figure 7:
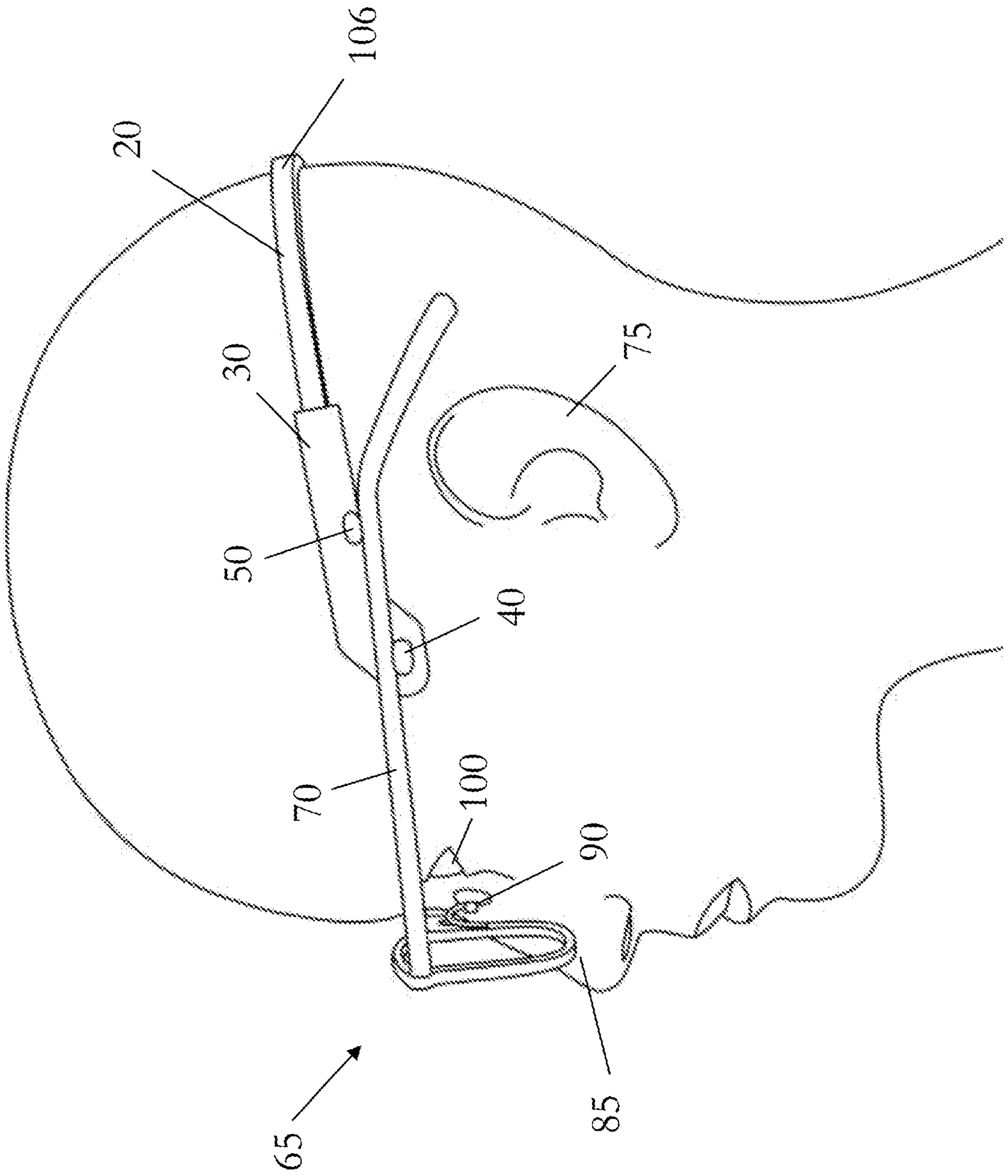

The spectacles 65 are then pushed in towards the user's head such that the lenses are closer to the user's eyes 100, as shown in FIG. 7. The nose pads 90 may be in contact with the user's nose 85, dependent on the user's preference, but the arms 70 are held away from the user's ears 75.

The invention claimed is:

1. A spectacles supporting headband, for use with spectacles of the type which comprises lenses, a bridge, and two arms positionable over a user's ears in use, the spectacles supporting headband comprising:

a head-gripping member; and a first L-shaped bracket and a second L-shaped bracket, the first L-shaped bracket and the second L-shaped bracket each comprising a first arm, a second arm, a first projection, and a second projection, wherein each first projection of the first and second L-shaped brackets is located on the first arm of the respective first and the second L-shaped brackets, wherein each second projection of the first and second L-shaped brackets is located on the second arm of the respective first and second L-shaped brackets, and wherein each first and second projection of the first and second L-shaped brackets projects radially outward from the head-gripping member, the spectacles supporting headband configured to move between an inactive position, and an active position, relative to the user's head, wherein, in the active position, each first projection is configured to support a respective arm of the spectacles, such that the spectacles are lifted, and held, off the ears of the user, and wherein each respective second projection is configured to grip the respective arm of the spectacles between it and the respective first projection, each of the first and second projections being in a fixed location relative to the headband, to thereby prevent the respective arm of the spectacles tilting relative to the head-gripping member.

2. The spectacles supporting headband according to claim 1, wherein each first projection is configured to support a respective arm of the spectacles in use, such that the spectacles are lifted, and held, off the nose.

3. The spectacles supporting headband according to claim 2, configured such that in use each first projection extends underneath the respective arm of the spectacles, and each second projection extends above the respective arm of the spectacles.

4. The spectacles supporting headband according to claim 2, configured such that in use each second projections of the first and the second L-shaped brackets is located behind the first projections of the respective first and second L-shaped brackets.

5. The spectacles supporting headband according to claim 1, wherein the head-gripping member comprises an open loop of resilient material configured to fit snugly around a user's head in use.

6. The spectacles supporting headband according to claim 1, configured such that in use each first projections of the first and the second L-shaped brackets is located between the user's ears and the user's face.

7. The spectacles supporting headband according to claim 1, wherein each first projection comprises a rounded profile to aid its rotation relative to the respective arm of the spectacles, in use, as the spectacles supporting headband is moved between the inactive and active positions.

8. The spectacles supporting headband according to claim 1, wherein each first and second projection of the first and second L-shaped brackets has the shape of an elliptic cylinder having a height that projects radially outward from the head-gripping member.

9. A method of adjusting the position of a pair of spectacles on the head of a user, the method comprising:

providing a spectacles supporting headband, for use with spectacles of the type which comprises lenses, a bridge, and two arms positionable over a user's ears in use, the spectacles supporting headband comprising a head-gripping member and a first L-shaped bracket and a second L-shaped bracket, the first L-shaped bracket and the second L-shaped bracket each comprising a first arm, a second arm, a first projection, and a second projection, wherein each first projection of the first and second L-shaped brackets is located on the first arm of the respective first and the second L-shaped brackets, wherein each second projection of the first and second L-shaped brackets is located on the second arm of the respective first and second L-shaped brackets, and wherein each first and second projection of the first and second L-shaped brackets projects radially outward from the head-gripping member, and wherein each second projection of the first and second L-shaped brackets is located behind the first projection of the respective first and second L-shaped brackets;

placing the head-gripping member around the user's head such that each first projections is below the level of the top of the user's ear;

placing a pair of spectacles on the user's head such that the lenses are in front of the user's eyes; and rotating the spectacles supporting headband relative to the user's head such that each first projection contacts the undersides of a respective arm of the spectacles and lifts the respective arm away from the user's ears.

10. The method of claim 9, further comprising the step of further rotating the spectacles supporting headband relative to the user's head so that each respective second projection contacts the upper sides of the respective arm of the spectacles, such that each arm of the spectacles is gripped between the respective first and second projections.

11. A method of adjusting the position of a pair of spectacles on the head of a user, the method comprising:

providing a spectacles supporting headband, for use with spectacles of the type which comprises lenses, a bridge, and two arms positionable over a user's ears in use, the spectacles supporting headband comprising a head-gripping member and a first L-shaped bracket and a second L-shaped bracket, the first L-shaped bracket and the second L-shaped bracket each comprising a first arm, a second arm, a first projection, and a second projection, wherein each first projection of the first and second L-shaped brackets is located on the first arm of the respective first and the second L-shaped brackets, wherein each second projection of the first and second L-shaped brackets is located on the second arm of the respective first and second L-shaped brackets, and wherein each first and second projection of the first and second L-shaped brackets projects radially outward from the head-gripping member, wherein the each second projection of the first and second L-shaped brackets is located behind the first projection of the respective first and second L-shaped brackets;

placing the head-gripping member around the user's head such that each first projections is above the level of the top of the user's ear;

placing a pair of spectacles on the user's head such that each first projection contacts the undersides of a respective arm of the spectacles, and each second projection contacts the upper sides of the respective arms of the spectacles; and rotating the spectacles supporting headband relative to the user's head about the point located on the head-gripping member, such that the lenses are in front of the user's eyes, and the arms of the spectacles are held away from the user's ears.

* * * * *